Nov. 15, 1960

N. E. PROCHASKA ET AL 2,960,688

POSITIONING DEVICE

Filed Nov. 12, 1958

INVENTORS
NORMAN E. PROCHASKA
& RAY A. YOUNG
BY
*Williams & Tilbury*
ATTORNEYS

Nov. 15, 1960

N. E. PROCHASKA ET AL 2,960,688

POSITIONING DEVICE

Filed Nov. 12, 1958

INVENTORS
NORMAN E. PROCHASKA
& RAY A. YOUNG
BY

Williams & Tilbury
ATTORNEYS

Nov. 15, 1960

N. E. PROCHASKA ET AL 2,960,688

POSITIONING DEVICE

Filed Nov. 12, 1958

INVENTORS
NORMAN E.
PROCHASKA &
RAY A. YOUNG

BY
Williams & Tilbury
ATTORNEYS

Nov. 15, 1960   N. E. PROCHASKA ET AL   2,960,688
POSITIONING DEVICE

Filed Nov. 12, 1958   8 Sheets-Sheet 6

*INVENTORS*
*NORMAN E. PROCHASKA*
*& RAY A. YOUNG*
BY
Williams & Tilbury
ATTORNEYS

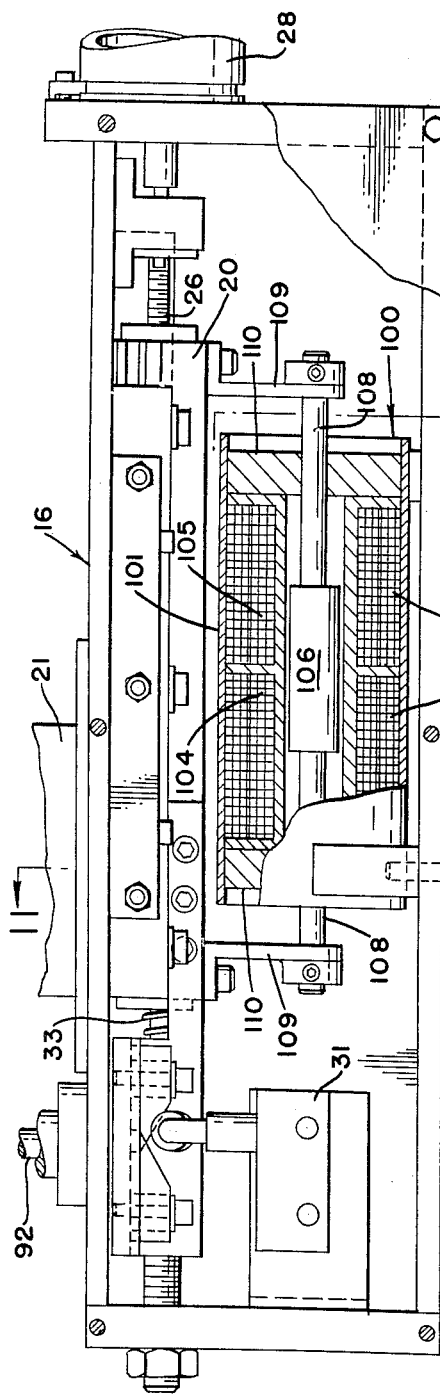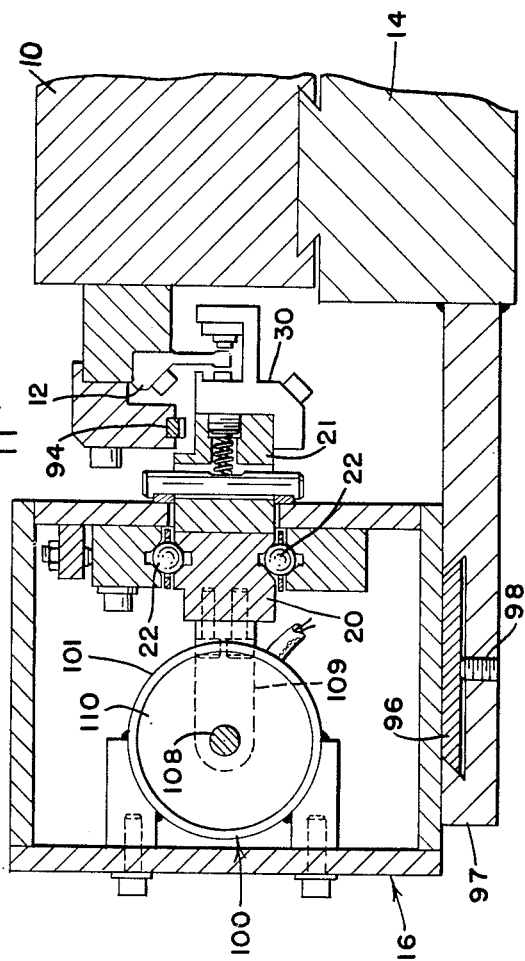

Nov. 15, 1960    N. E. PROCHASKA ET AL    2,960,688
POSITIONING DEVICE

Filed Nov. 12, 1958    8 Sheets-Sheet 8

INVENTORS
NORMAN E. PROCHASKA
& RAY A. YOUNG
BY
Williams & Tilbury
ATTORNEYS

United States Patent Office 2,960,688
Patented Nov. 15, 1960

2,960,688

POSITIONING DEVICE

Norman E. Prochaska, Parma, and Ray A. Young, Willoughby, Ohio, assignors to Cleveland Instrument Company, Cleveland, Ohio, a corporation of Ohio Filed Nov. 12, 1958, Ser. No. 773,475

35 Claims. (Cl. 340—282)

This application relates in general to positioning apparatus for locating two or more relatively movable elements, one with respect to the other, whether the positioning means be linear, Cartesian, radial (polar), or spherical, or any combination of these means.

More specifically the invention relates to positioning means employing a principle of vernier relationship between two or more relatively movable members of a mechanism. It is contemplated that this concept be used for locating a point or points in space, i.e., locating a point with reference to Cartesian or polar co-ordinates. Whether the means for locating a point be employed, by way of illustrative embodiment, by means of armatures and transducers, markings on a lead screw, lightbeams, air jets, physical stops or pawls, refraction gradings, etched lines, or markings on movable members which are visually aligned, or any other applicable method of sensing, the invention is still the same.

In one preferred embodiment, the invention contemplates relating one vernier relationship between parts of a mechanism to a second vernier relationship between certain common parts and other additional parts not elements of the first vernier relationship. This concept may be analogized to the employment of a vernier upon a vernier or, otherwise stated, a compound vernier. For purposes of the following discussion, a vernier is understood to comprise a pair of scales having suitable matching indicia thereon to provide a vernier relationship between said scales which co-act to subdivide a finite distance.

By way of illustration, the invention is applicable to the problem of locating a movable element of a machine tool relative to its usually immovable elements. In the illustrative embodiment disclosed in this application a plurality of electromagnetic transducers arranged as a scale are fixed to the immovable bed of a machine tool. Also secured to the bed of the machine tool is a slide member upon which is mounted a plurality of armatures arranged as a scale, these armatures having a vernier relationship to the transducers fixed to the bed of the machine tool. With this arrangement it is possible, by selecting the output of one of the transducers and feeding this output into a servo-positioning means, to cause the slide member of the machine tool to move laterally under the stimulus developed by the relationship of the transducers and armatures.

Also mounted on the slide member for simultaneous movement therewith is a bridge or yoke member which carries a second plurality of transducers arranged as a scale to co-act with a second plurality of armatures secured to the platen or movable table of the machine tool and also arranged as a scale. The output signal from the selected transducer mounted on the bridge member is fed to yet another servo-positioning drive means to position the platen relative to the bed of the machine. Once the significance of this concept is appreciated, it then becomes readily apparent to those skilled in the art that a second similar arrangement of scales will provide for two-dimensional location, and that yet a third similar arrangement will provide for three-dimensional location. Thus, defining the operation of the mechanism in terms of Cartesian coordinates, the first discussed arrangement will provide for location of the movable element of the machine tool along an X axis, the second combination will provide for further positioning along a Y axis, and the third combination will provide for yet additional positioning along a Z axis; the X axis relating to linear positioning, the Y axis relating to two-dimensional positioning, and the Z axis to three-dimensional or space positioning. It will be understood that any angular relationship between the axes other than right angles may be selected.

With this illustrative embodiment, it is conceivable that a tool may be mounted on a platen for positioning; or in the alternative, a work piece may be mounted on a platen to be brought into position relative to a tool. Furthermore, although the discussion of the invention up to this point has related primarily to machine-tool positioning problems, it is contemplated that the application of the invention is not restricted to the machine-tool art, but is broadly applicable to any problems of locating one element relative to another particularly where a high degree of precision is required. Thus, the invention offers solutions to computer problems and techniques as well as the problems of location and positioning of highly accurate instruments whatever their eventual end use.

Certain background details relevant to this invention are disclosed in co-pending application Serial No. 582,221, entitled "Machine Tool Locating Mechanism," and assigned to the assignee of the present invention. The background disclosures made in this patent application are hereby incorporated in the present application by reference. The apparatus disclosed in patent application Serial No. 582,221 relates to a machine tool having a movable element such as the turntable of a milling machine and a fixed bed upon which the turntable is mounted, a use to which the present invention is also directed. In the Serial No. 582,221 application a plurality of armatures are fixed to the periphery of the turntable and a corresponding plurality of transducers or pickup heads are fixed to the immovable bed portion of the machine. By arranging the transducers in vernier relationship with the armatures, locating accuracies and efficiencies have been obtainable which have heretofore not been possible. These transducers will hereinafter be referred to as "short stroke" transducers to distinguish them from another preferred example of a transducer identified as a "long stroke" transducer. The long stroke transducer will be fully described and illustrated as the discussion of the invention is developed hereinbelow.

In order for the Serial No. 582,221 application device to be successfully operable, the magnetic sensitivity of each armature must be identical to the magnetic sensitivity of every other armature, the sensitivity of each transducer must be identical to the sensitivity of every other transducer, and the sensitivities between each armature and each transducer must also be identical. The necessity for identical magnetic sensitivities of the armatures and transducers in the Serial No. 582,221 application resides in the fact that every armature must selectively co-act with every transducer to provide a position-locating signal. If the sensitivities of the armatures and transducers were to vary from member to member, the signals developed by the transducers would vary from armature to armature, and would indicate false positions. This has presented problems in properly magnetically balancing the system, and it has been found that armatures of apparently identical physical properties, metallurgically speaking, vary widely with respect to their magnetic properties.

It is therefore a primary object of the present invention to provide a measuring and/or positioning system employing transducers and armatures in which the sensitivity of each armature relative to every other armature is not critical; in which the sensitivity of each transducer relative to every other transducer is not critical; to provide a measuring and/or positioning system requiring substantially fewer elements and requiring less time for setting the elements with respect to one another than heretofore necessary; to provide a device of the type described which adapts itself for attachment to any mechanism in a compact, separately housed unit; to provide a device of the type described which employs transducer means in vernier relationship with armature means adapted to position yet other transducer means relative to still other armature means; to provide novel indexing means adapted to position an indicator which in turn co-acts with means on a movable portion of a mechanism to locate the movable portion; to provide a novel device of the type described including a first scale in vernier relationship with a second scale, a third scale in vernier relationship with a fourth scale, said second and third scales being coupled or yoked together so that movement of the second scale automatically moves the third scale to provide a positional relationship between the third and fourth scales; to provide improved means to facilitate work piece set up and alignment; to provide base line adjustment for work pieces and tools; and in general to provide an improvement in positioning and measuring means for application where a high degree of accuracy is essential.

To the accomplishment of the foregoing and related ends, the invention then comprises means hereinafter fully described and particularly pointed out in the claims, the annexed drawings, and the following description setting forth in detail certain structure embodying the invention, such disclosed means constituting, however, but one of various forms in which the principle of the invention may be employed.

Figure 10 is a sectional view of a long stroke transducer employed in an alternate embodiment of the invention;

Figure 11 is a sectional view of a long stroke transducer taken on the line 11—11 of Figure 10 and rotated 90° clockwise;

Reference will now be made to the drawings in greater detail.

Figure 1:
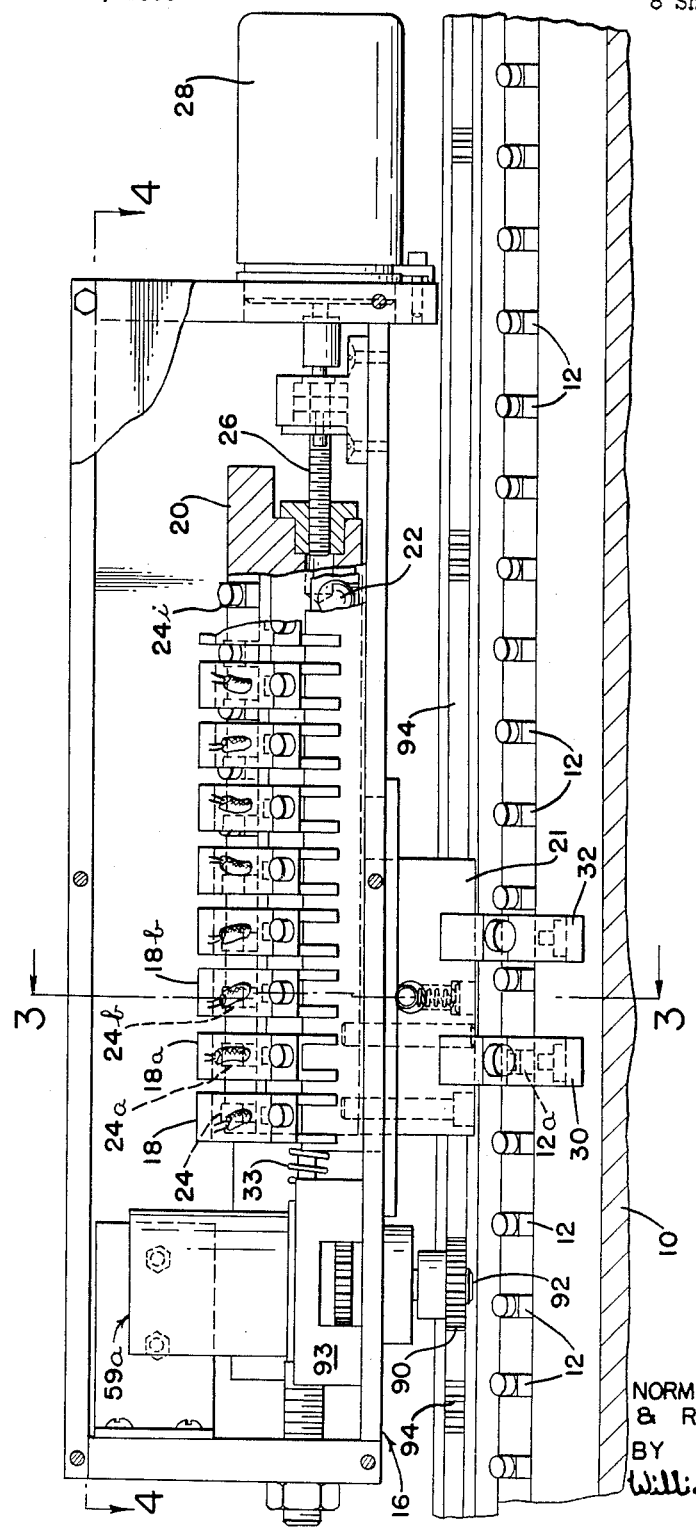
Figure 1 is a bottom plan view in section of an illustrative embodiment of the invention taken on the line 1—1 of Figure 3 and rotated 90° clockwise.

For simplicity of disclosure, and clarity of exposition, assume the positioning means embodying the subject invention is adapted for locating the movable platen or table of a machine tool such as a boring mill, milling machine, or the like, relative to its immovable bed. The table is designated at 10 (Figures 1, 2, and 3) upon which are fixed a plurality of armatures 12 magnetically spaced apart one from the other. Secured to the immovable bed 14 is a housing 16 containing a plurality of transducers 18 through 18k magnetically spaced apart and immovably secured to the housing 16. A slide 20 is mounted on antifriction means such as ball bearings 22 to carry a plurality of armatures 24 through 24k secured to the slide for movement therewith. The slide 20 is connected to a screw 26 which in turn is driven by a servo-motor 28.

Each transducer 18 through 18k has a corresponding armature 24 through 24k; thus, armature 24a is adapted to co-act only with transducer 18a; in like manner, armature 24b is adapted to co-act only with transducer 18b, etc. Accordingly, it is not necessary for the proper functioning of this embodiment of the invention that the armatures 24 through 24k or the transducers 18 through 18k have identical magnetic sensitivities relative to each other. Nor is it necessary that armatures 24 through 24k be physically related to each other, or that transducers 18 through 18k be physically related to each other. It is only necessary that physical relationship exists between an armature and its corresponding transducer. It is necessary, however, that each transducer and its corresponding armature be magnetically balanced to provide a linear signal relative to displacement of the armature from dead-center position relative to the transducer. It is therefore important to know the characteristics of each armature relative to its corresponding transducer so that for a given displacement from zero it will be known that a voltage of predetermined magnitude will be developed in the transducer by way of a positioning signal.

Figure 2:
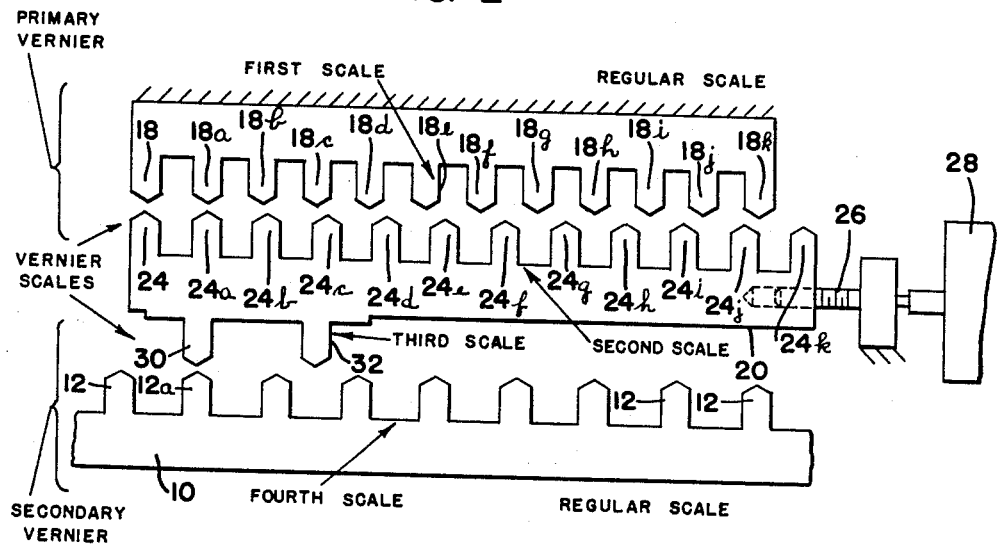
Figure 2 is a schematic representation of the embodiment of the invention shown in Figure 1.
Figure 3:
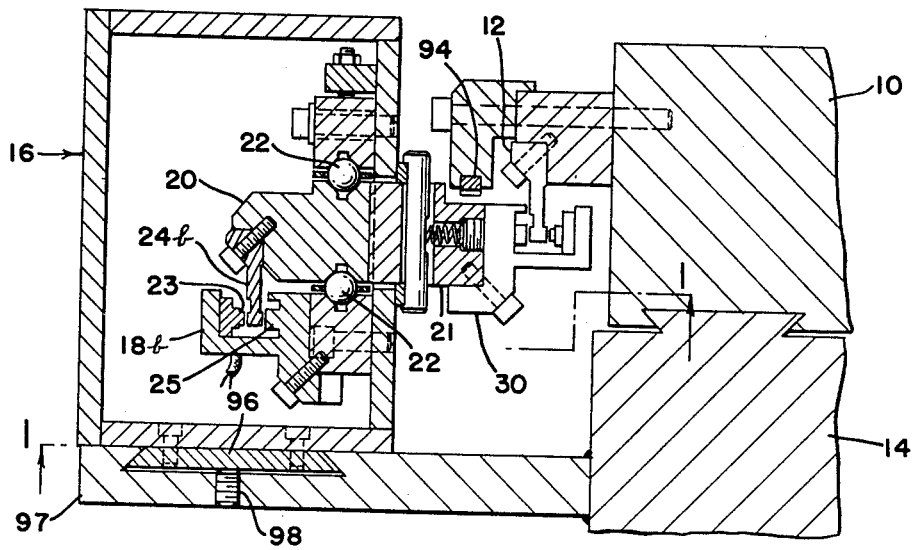
Figure 3 is an elevational view in section of the illustrative embodiment of the invention taken on line 3—3 of Figure 1 and rotated 90° counter clockwise.
Figure 4:
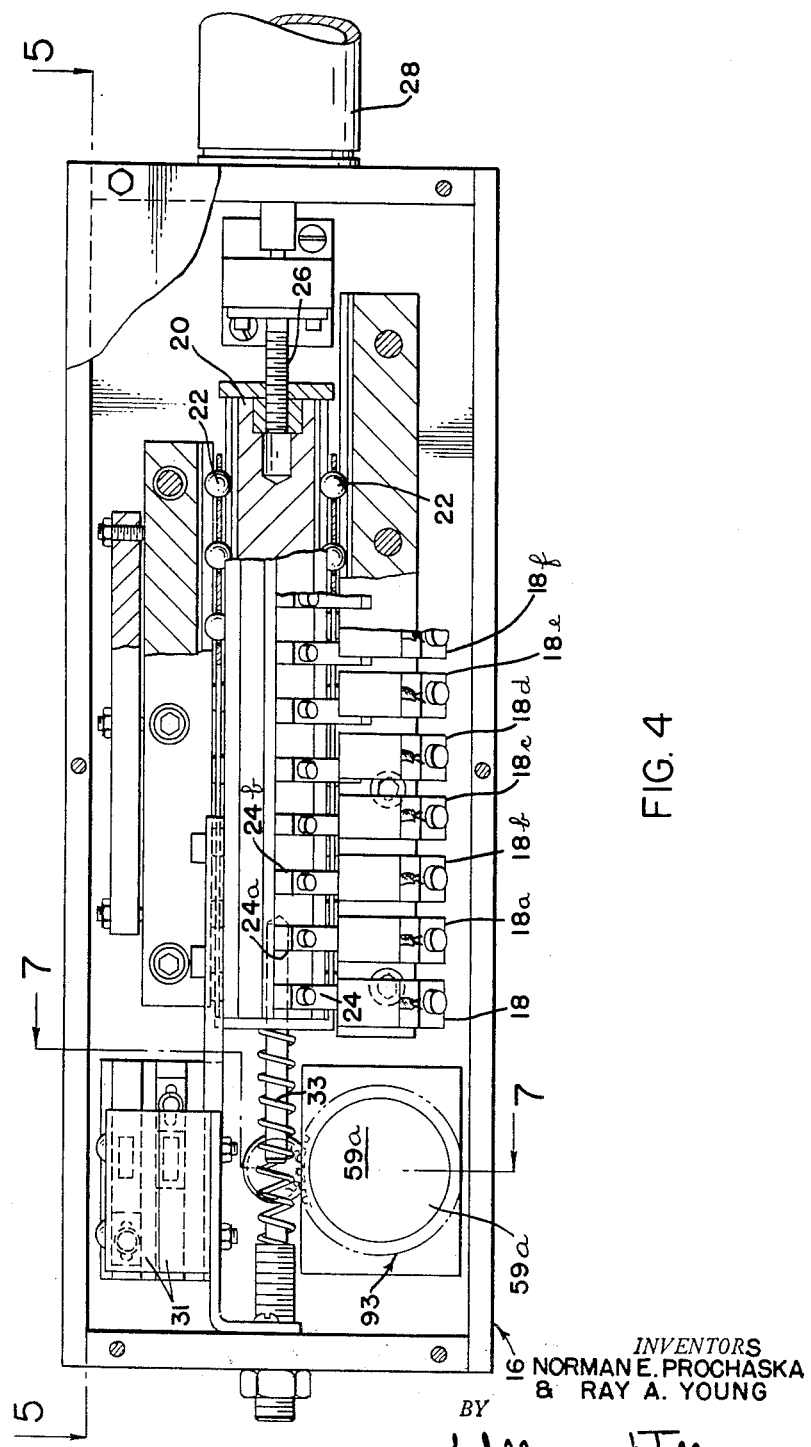
Figure 4 is an elevational view in section of the illustrative embodiment of the invention taken on line 4—4 of Figure 1.
Figure 5:
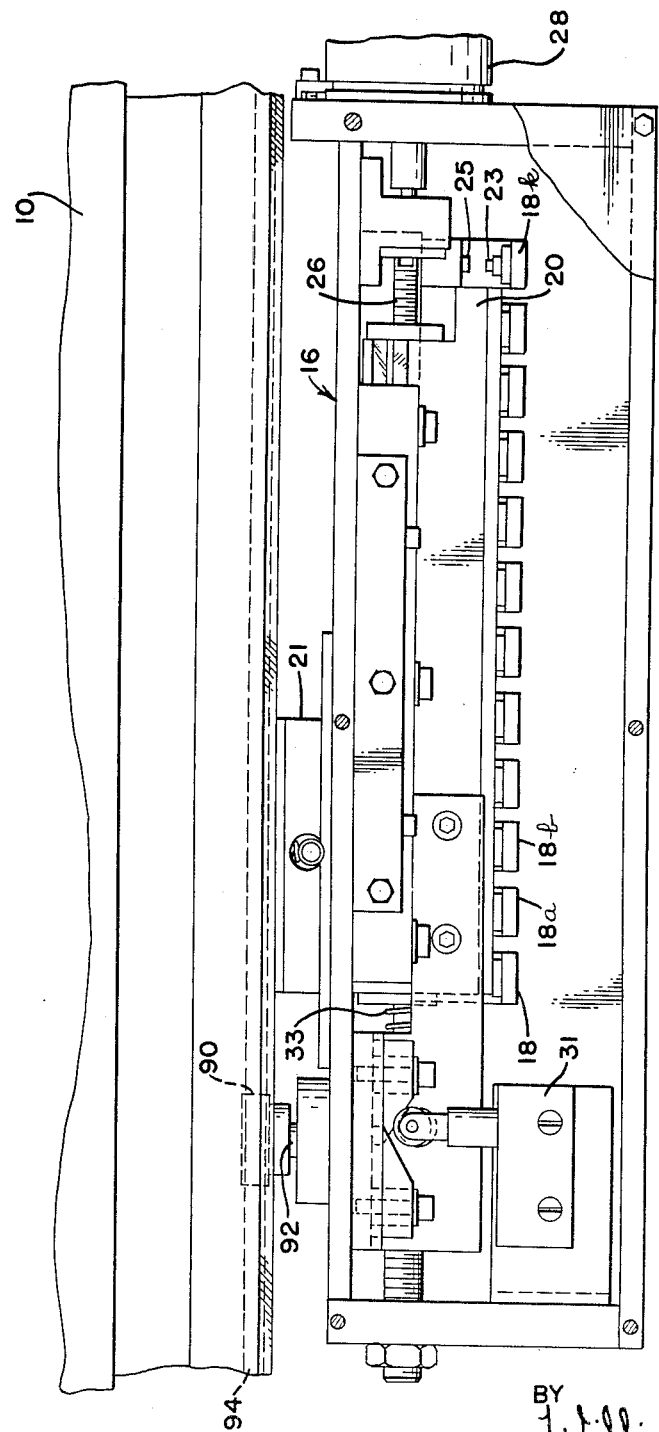
Figure 5 is a top plan view in section of the illustrative embodiment of the invention taken on line 5—5 of Figure 4.

As best shown in Figure 2 there exists a vernier relationship between the transducers 18 through 18k and the armatures 24 through 24k. To this end, the arrangement of the armatures may be referred to as a vernier scale and the arrangement of the transducers may be referred to as a regular scale, the co-action between the two scales providing the vernier method of subdivision of a finite unit of space. Thus, for the purposes of this application, a vernier will comprise a pair of scales adapted to co-act in the manner just described, and the arrangement of transducers 18 through 18k and armatures 24 through 24k as first and second scales will hereinafter be referred to as the "primary vernier."

Figure 8:
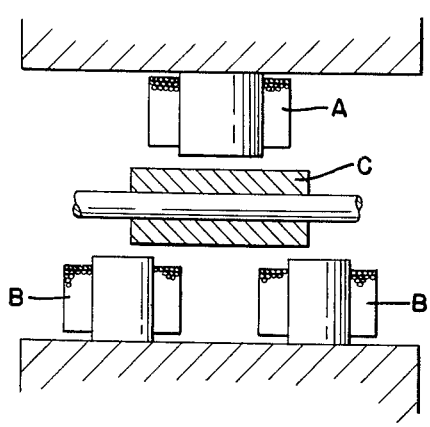
Figure 8 is a schematic view of a short stroke transducer showing its physical arrangement.
Figure 9:
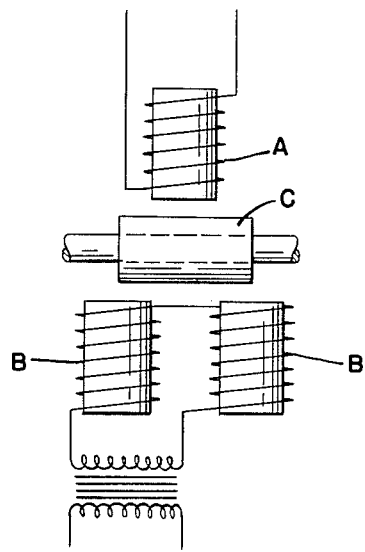
Figure 9 is a schematic view of a short stroke transducer showing its electrical arrangement.

There is also secured to the slide 20 a bridge 21 adapted to carry at least one short stroke transducer 30 secured thereto for sliding adjustment relative to the movable table 10. For the purpose of this application, a short stroke transducer comprises a primary exciter coil A and a pair of secondary excited coils B spaced apart from the primary coil to provide a small gap therebetween. (See Figures 8 and 9.) An armature C of ferromagnetic metal is adapted to be passed between the primary and secondary coils, to discreetly influence the distribution and intensity of the magnetic field therebetween. When the flux fields between the primary coil A and each secondary coil B are equally distributed and of equal intensity, the armature is magnetically centered and a null signal condition is developed. Short stroke transducers of this variety are highly accurate for small movements of the armature. Thus a plurality of transducers may be resorted to when the effective stroke of the armature must be increased.

The transducer 30 is adapted to consecutively receive between its primary and secondary pole pieces 23 and 25 (see Figure 3) the plurality of evenly spaced armatures 12 secured to the table 10. In a preferred modification, even multiples of two or more transducers such as transducers 30 and 32 are employed to provide a vernier relationship between these transducers and the armatures 12 on table 10. Thus, the armatures 12 may be considered a regular scale, and transducers 30 and 32 may be considered a vernier scale, the two scales coacting to provide a vernier hereinafter referred to as the "secondary vernier." (See Figure 2.)

With the embodiment of the mechanism as described to this point, the table 10 can now be precisely located relative to the bed 14 of the device generally in the following manner. For illustrative purposes, the procedure may be described as comprising two steps, the first of which comprises the selection and energization of a predetermined transducer on the first scale (transducer 18a for instance), the position of which is known relative to the bed 14. Transducer 18a develops a signal transmitted to servo-motor 28 to actuate the servo-motor to drive slide 20 until armature 24a is properly positioned relative to transducer 18a. In the system employed, a null-signal condition is obtained which operates to deactivate the servo-motor. If it is desired that armature 24a be located other than magnetically on dead center relative to transducer 18a, then at the same time that the transducer is selected, an appropriate counter E.M.F. or "bucking" voltage is selected to oppose the signal developed in the transducer 18a when the armature co-acts with the armature 24a to develop a signal. When the signal developed by the transducer 18a with the co-action of the armature 24a is equal and opposite to the bucking voltage, a compensated or adjusted null point is arrived at to obtain a gradient of the position established by the true null point. At the same time that armature 24a is being located relative to transducer 18a, the transducer 30, which is coupled by bridge 21 for movement with slide 20, is also positioned. Limit switches 31 (Figures 3, 4, 5 and 7) prevent an overrun of slide 20 by de-energizing servo-motor 28 when the maximum safe travel of slide 20 has been reached. Spring means 33 (Figure 1) are provided to eliminate lost motion or back lash between slide 20 and servo-motor connecting screw means 26.

The second step in the operation comprises the act of positioning the table 10 relative to transducer 30. To this end, rough positioning means are employed comprising means to energize transducer 30 and to move the table 10 until a preselected armature (armature 12a for instance), is positioned within the flux field of transducer 30. Thereafter, co-action between armature 12a and energized transducer 30 develops a signal which is fed to a null finding bridge circuit connected to servo-motor 28 to finally position armature 12a. Once the null signal condition is established, servo-motor 29 is deactivated.

As aforesaid, modification of the relationship between armatures 12 and transducer 30 may be employed to reduce the number of armatures on the table 10. Thus, by adding yet another transducer 32 spaced apart from transducer 30 by the displacement of slide 20, it will be seen that armature 12 spacing can be doubled or the number of armatures can be reduced by half, since a transducer 12 is always within the range of either transducer 30 or transducer 32. Thus, by selectively energizing either transducer 30 or transducer 32, the same end result it obtained as that with one transducer and twice as many armatures. It follows therefore that the addition of transducers 30 and 32 will operate to reduce the number of armatures on the table 10.

By applying a bucking voltage to the energized transducer (transducer 30 for example), a further refinement in positioning may be obtained, since with a bucking voltage of known or controlled magnitude the armature 12 on table 10 can be adjustably positioned any desired amount to the right or to the left of the magnetic center of the transducer. With this arrangement, however, each armature must be equal in sensitivity to every other armature, and each of the transducers carried by bridge 21 must be equal in sensitivity. In the preferred embodiment, therefore, armature 12 is always positioned at null of transducer 30, thereby avoiding the necessity for like sensitivities of armatures and transducers. The employment of bucking voltage to transducer 30 is mentioned only to illustrate the degree of flexibility of application of the invention.

A still further positioning refinement is contemplated which may be described as "base line adjustment." Assume that table 10 has a normal zero or base line position relative to base 14, and is linearly traversable away from this position. Assume further that it is desired to locate a work piece on the table 10 in line with a pre-located tool so that the work piece will be positioned for the first machining operation. Seldom is it practical or sometimes even possible to set up a work piece exactly at a pre-established location on the table. Each job may differ so that whereas one work piece may be set up ten inches from the edge of the table, at the machinist's discretion, the next job may be set up ten and one sixty-fourth inches from the edge of the table, and so forth. Since this information usually cannot be predetermined so as to be included as "set up" information on the master control card or tape, a "base line adjustments" is resorted to as follows. First, the table 10 is shifted until the desired alignment between work piece and tool is obtained. This table shift, however, disturbs the normal zero or base line relationship between table and base 14. As a consequence no armature 12 is any longer in zero alignment with either transducer 30 or 32. Since, as will be explained hereinafter more fully, it is a condition precedent that such alignment exist to provide a starting reference point, the entire housing 16 is shifted until an armature 12 is once more in alignment with either transducer 30 or 32. Thereafter automatic table indexing may be controlled by intelligence on punched card or tape means. For this purpose, a dove-tail 96 (see Figure 3) secured to housing 16 is matched to slide in a mortised portion 97 secured to base 14. The mortise and dove-tail may be locked together by a set screw 98.

Figure 6:
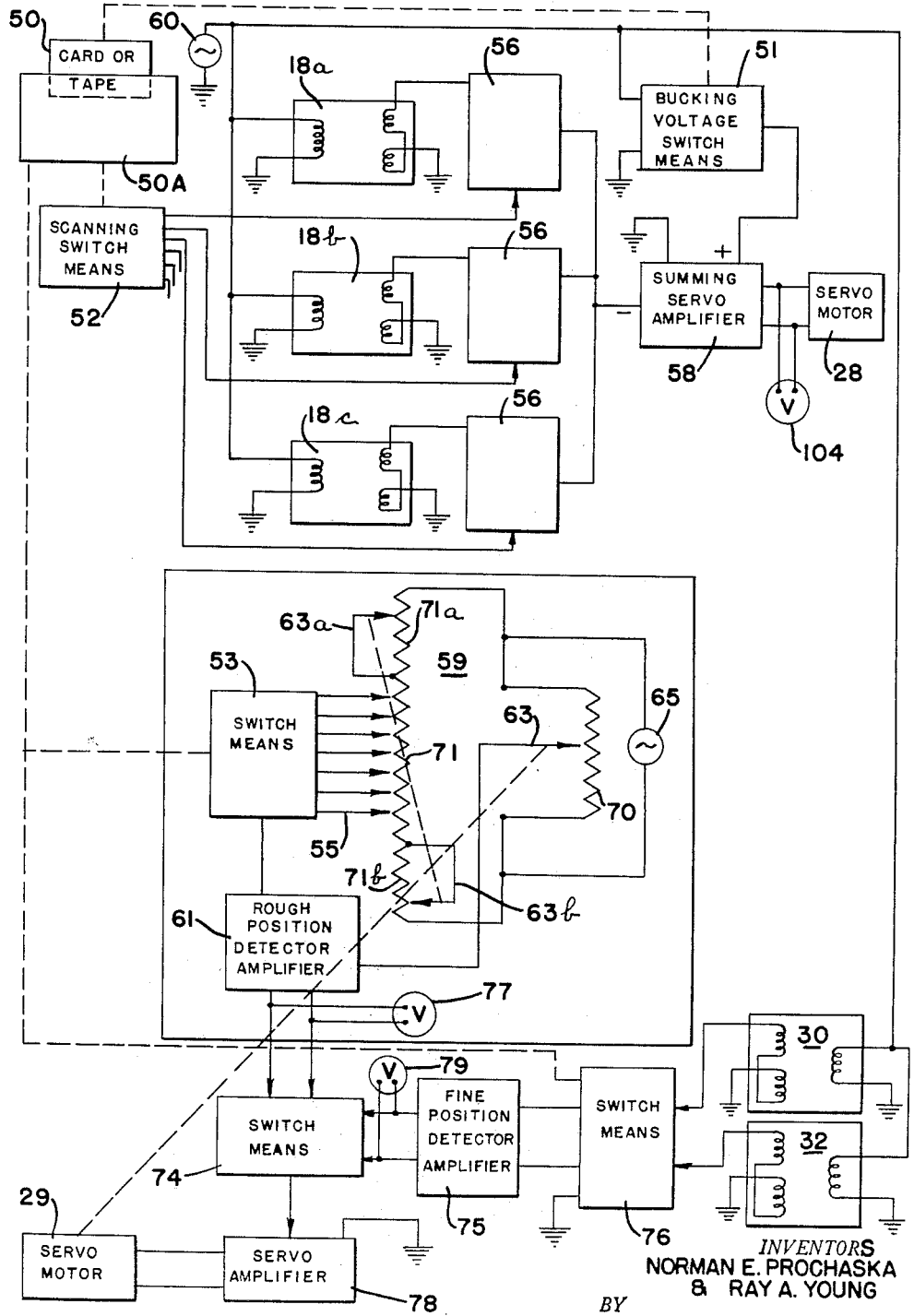
Figure 6 is a schematic diagram illustrating the principle of operation of the embodiment of the invention employing a short stroke transducer.
Figure 7:
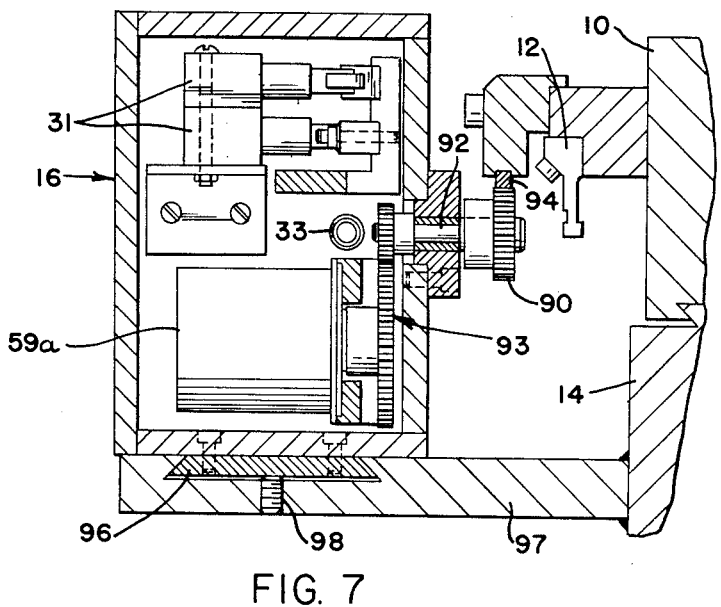
Figure 7 is an elevational view in section of the illustrative embodiment of the invention taken on line 7—7 of Figure 4.

Reference is now had to Figure 6 which is a schematic diagram illustrating the over-all general arrangement and general principle of operation of a preferred embodiment of the mechanism. The intermediate means for achieving the end results are standard in the industry and well understood by those skilled in the arts. For this reason, detailed wiring diagrams are not resorted to in that they contribute nothing to the understanding of the invention and will constitute nothing more than standard practice.

The means for obtaining a desired location of the table 10 relative to the base 14 of the machine can be set up manually, or the necessary information can be placed upon a coded card, tape, or the like 50. The information on the card, tape, or the like, is then placed in a suitable processing machine 50A adapted to actuate a scanning switch means 52. The scanning switch means 52 is connected to each switch means 56 and is adapted to energize only one of the switch means 56 to connect a selected transducer, (transducer 18a for instance), to a summing servo amplifier 58. In the alternative the foregoing can be done manually by operator selector switches (not shown). A source of energy is provided at 60 to energize the transducer 18a and bucking voltage switch means 51, which is also connected to the summing servo amplifier 58. The summing servo amplifier algebraically adds the respective voltages from transducer 18a and bucking voltage switch means 51. A servo-motor 28 is connected tosumming servo amplifier 58 and runs either forward or in reverse depending on the sign of the voltage received from the amplifier. Servo-motor 28 is then activated to position the slide 20 upon which are mounted the armatures 24. When the armature 24a is shifted relative to transducer 18a until the zero position has been reached, voltages from transducer 18a and bucking voltage switch means 53 are equal and opposite and the servo-motor is stopped. This comprises final positioning of slide 20 relative to housing 16. A voltmeter 104 is tapped onto the lines connecting the summing servo amplifier 58 to servo-motor 28 to provide a visual indication of zero relationship between armature 24a and transducer 18a.

At the same time the scanning switch means 52 is energized, switch means 53 connects a pre-selected tap 55, for instance, from one side of a null finding bridge circuit 59 to a detector amplifier 61. A second tap 63 is connected to the other side of the bridge circuit 59 and to the detector amplifier 61. Both sides of the bridge circuit are energized from an energy source 65. The tap 63 is also physically connected to the servo-motor 29 and is slidable thereby along resistance 70 to vary the resistance of this side of the bridge 59 until the voltages detected by the amplifier 61 from both sides of bridge 59 are equal. Bridge 59 is connected through switch means 74 to servo amplifier 78 and servo-motor 29. When bridge 59 becomes balanced, its voltage drop becomes zero and servo-motor 29 is de-energized to stop the traverse of table 10. This completes the rough positioning of table 10 to base 14. Delay operated switch means 74 responsive to a zero signal from amplifier 61 then disconnects rough position detector amplifier 61 and connects fine position detector amplifier 75. Switch means 76 is operable responsive to the data on card 50 to connect the proper transducer 30 or 32 to fine position detector amplifier 75. Servo amplifier 78 is thereafter energized to re-energize servo-motor 29 for zeroing of armature 12 relative to transducer 30 or 32. This completes the fine positioning of table 10 relative to base 14. A voltmeter 77 is tapped to the leads between detector amplifier 61 and switch means 74, and voltmeter 79 is tapped to the leads between detector amplifier 75 and switch means 74 to provide a visual indication of the conduction of balance of bridge 59. Voltmeters 77 and 79 also are necessary for base line adjustment, as will be discussed more fully hereinbelow.

The mechanical features of the rough positioning means 59 of table 10, described above, are also shown in Figures 4 and 7. A rotary potentiometer 59a is mounted in housing 16. A potentiometer pinion 90 is secured to shaft 92 and adapted to run on rack 94 (see also Figure 1) secured to the underside edge of table 10. Shaft 92 is connected to gear reduction means 93 from which is driven the potentiometer tap 63 (see Figure 6) which traverses the potentiometer resistance 70 from end to end in accordance with the movement of table rack 94.

As referred to hereinabove, it is sometimes desirable to effect a base line adjustment. It will be apparent from an inspection of the rough positioning means of Figure 6, that shifting of table 10 to bring a workpiece into alignment with a tool, and shifting of housing 16 to re-align transducer 30 or 32 with armature 12, will unbalance bridge circuit 59, based upon the premise that the circuit is balanced when the table 10 is at some initial zero or base line position. To adjust for this unbalance, resistance 71 is provided with resistance extensions 71a and 71b, and a tap 63a in association with resistance 71a is mechanically connected to a tap 63b in association with resistance 71b. Thus, by shifting tapes 61a and 61b up or down as required by watching voltmeter 77, the bridge 59 is re-balanced to a new base line.

Figure 12:
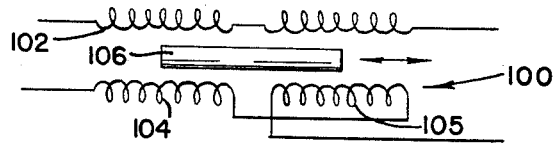
Figure 12 is a schematic view of a long stroke transducer showing its electrical arrangement.

The arrangement of a plurality of short stroke transducers 18 as described hereinbefore provides for very accurate positioning of armatures 30 and 32. There are certain applications of the invention, however, in which a lesser degree of accuracy is acceptable. In these applications one long stroke transducer 100 may be substituted for the plurality of short stroke transducers 18 through 18k. The long stroke transducer 100 is shown in Figure 10, and schematically in Figure 12, and comprises a casing 101 housing an outer exciter winding 102, concentric inner pickup winding 104 and 105 and a magnetic armature 106 mounted on non-magnetic shafts 108 carried in plain end bearings 110. Shafts 108 are connected to slide 20 by arms 109 for integral movement therewith. It will be observed that the balance of Figure 10 is similar to the arrangement of Figure 5 with the exception that longstroke transducer 100 of Figure 10 has replaced the plurality of short stroke transducers 18 of Figure 5. It will also be observed from Figure 12 that pickup windings 104 and 105 are arranged to develop opposed voltages which will be equal and opposite when armature 106 is magnetically centered therebetween.

Figure 13:
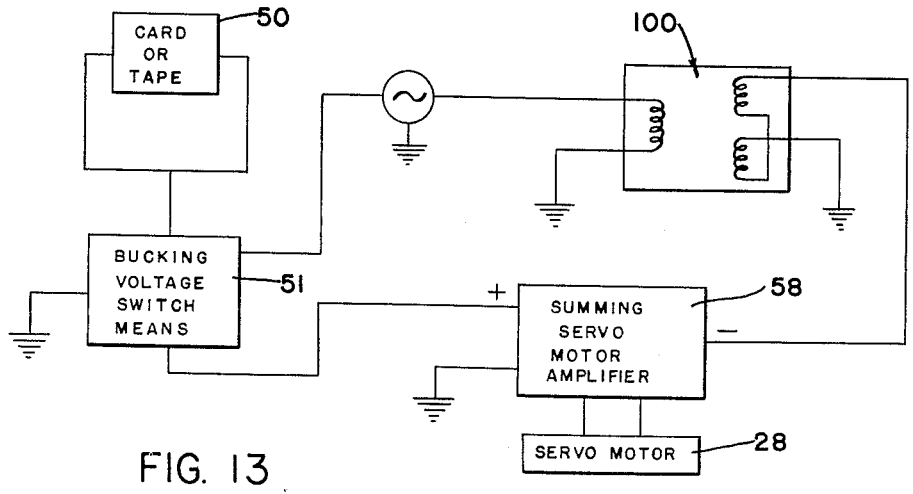
Figure 13 is a schematic diagram illustrating the principle of operation of the embodiment of the invention employing a long stroke transducer.

Refinements of armature position are obtained by use of a bucking voltage as shown in Figure 13. It will be observed that Figure 13 is similar to the portion of Figure 6 relating to the actuation of servo-motor 28, with the exception that scanning switch means 52 is eliminated, and long stroke transducer 100 is substituted for the plurality of transducers 18, and switch means 56. Thus, in Figure 13, the intelligence from card 50 is employed to determine the magnitude of bucking voltage delivered from bucking voltage switch means 51 to summing servo amplifier 58 for algebraic summing with the voltage from long stroke transducer 100, the summation of which is delivered to servo-motor 28. It is apparent, therefore, that the employment of the arrangement shown in Figure 13 considerably simplifies the invention in applications where the greater precision obtainable with short stroke transducers is not required.

Figure 14:
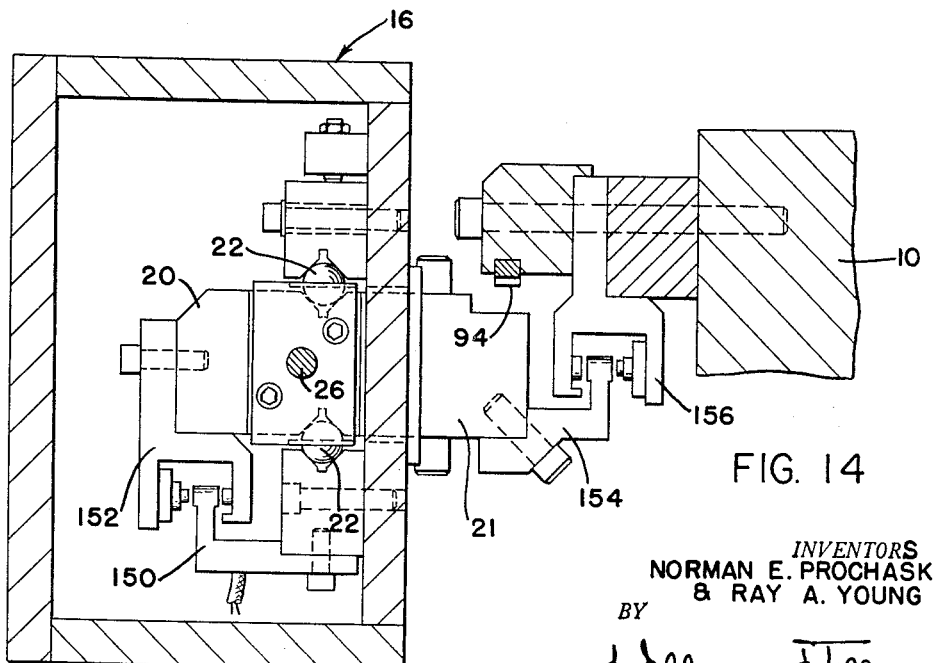
Figure 14 is a sectional view similar to Figure 3 of an embodiment of the invention showing an arrangement of parts substantially the reverse of Figure 3.

It is to be understood that whereas several embodiments of the invention have been described hereinabove, these embodiments are by way of example only and are not to be construed in a limiting sense. Other arrangements and modifications will occur to those skilled in the art upon reading the specification and the attached claims, and examining the included drawings. For instance, the relationship between armature scales and transducer scales may be reversed wherein the movable scales may be rendered immovable and vice versa. In like manner, no significance is attached to the fact that a movable scale is shown in the drawings as comprising a series of armatures, and the co-acting transducer scale is shown to be immovable. This is recognized to be a relative arrangement and may be reversed without affecting the operation of the mechanism. For instance, Figure 14 illustrates an embodiment of the invention in which armatures 150 are immovably secured in housing 16 and aligned to provide a first scale similar to that provided by transducers 18 shown in Figure 2. The second scale comprises a plurality of transducers 152 mounted on slide 20 in a manner similar to armatures 24. One or more armatures are carried on bridge 21 to co-act with a plurality of transducers 156 secured to table 10. Thus, this arrangement is substantially a reversal of the arrangement of armatures and transducers shown in the illustrative embodiment of the invention schematically disclosed in Figure 2. It is contemplated that still other combinations and modifications will occur to those skilled in the art and that these combinations and modifications may be resorted to without departing from the spirit and scope of the invention.

We claim:

1. In combination with a mechanism having a pair of members shiftable relative to each other, the improvement in means to position one member relative to the other member comprising: a pair of co-operating indexing means, one of said indexing means being immovably secured to one member, and the other of said indexing means being secured to said one member for shiftable movement relative to said first mentioned indexing means; a position indicator secured to the second mentioned indexing means; indicia affixed to the other member; means to select one of said indicia and to position said selected indicium relative to said indicator, whereby indexing between said first and second mentioned indexing means positions said indicator relative to said one member, and positioning of said indicium relative to said indicator locates said other member relative to said one member.

2. The device set forth in claim 1 including base line shift means comprising means to simultaneously shift said pair of indexing means and said position indicator to align said indicator with one of said indicia.

3. In combination with a mechanism having a pair of members shiftable relative to each other, the improvement in means to position one member relative to the other member comprising: a pair of co-operating indexing means, one of said indexing means being immovably secured to one member, and the other of said indexing means being secured to said one member for movement relative to said first mentioned indexing means; a position indicating transducer secured to the second mentioned indexing means; a plurality of armatures secured to and spaced apart on the other member along the path of movement of said members; means to energize said transducer; and means to position one of said armatures relative to said tranducer, whereby indexing between said first and second indexing means positions said transducer relative to said one member, and positioning of one of said armatures relative to said transducer locates said other member relative to said one member.

4. In combination with a mechanism having a pair of members shiftable relative to each other, the improvement in means to position one member relative to the other member comprising: a pair of co-operating indexing means, one of said indexing means being immovably secured to one member, and the other of said indexing means being secured to said one member for movement relative to said first mentioned indexing means; a position indicating armature secured to the second mentioned indexing means; a plurality of transducers secured to and spaced apart on the other member along the path of movement of said member; means to selectively energize one of said transducers; and means to position said energized transducer relative to said armature, whereby indexing between said first and second indexing means positions said armature relative to said one member, and positioning of said energized transducer relative to said armature locates said other member relative to said one member.

5. In combination with a mechanism having a pair of members shiftable relative to each other, the improvement in means to position one member relative to the other member comprising: a pair of co-operating indexing means, one of said indexing means being immovably secured to said one member, and the other of said indexing means being secured to said one member for movement relative to said first mentioned indexing means; a plurality of transducers secured to the second mentioned indexing means; a plurality of armatures secured to the other member in vernier relationship with said plurality of transducers; means to selectively energize one of said transducers; and means to position one of said armatures relative to said energized transducer, whereby said indexing means positions said transducers relative to said one member, and positioning of one of said armatures relative to said energized transducer locates said other member relative to said one member.

6. In combination with a mechanism having a pair of members shiftable relative to each other, the improvement in means to position one member relative to the other member comprising: a pair of cooperating indexing means, one of said indexing means being immovably secured to said one member, and the other of said indexing means being secured to said one member for movement relative to said first mentioned indexing means; a plurality of armatures secured to the second mentioned indexing means; a plurality of transducers secured to the other member in vernier relationship with said plurality of armatures; means to selectively energize one of said transducers; and means to position said energized transducer relative to one of said armatures, whereby said indexing means positions said armatures relative to said one member, and positioning of said energized transducer relative to one of said armatures locates said other member relative to said one member.

7. In combination with a mechanism having a pair of members shiftable relative to each other, the improvement in means to position one member relative to the other member comprising: a first scale immovably secured to one of said members; a second scale movably secured to said one member and in vernier relationship to said first scale; a position indicator secured to said second scale; indicia affixed to the other member; means to select one of said indicia and to position said selected indicium relative to said position indicator, whereby vernier positioning between said first and second scales positions said indicator relative to said one member, and positioning of said indicium relative to said indicator locates said other member relative to said one member.

8. In combination with a mechanism having a pair of members shiftable relative to each other, the improvement in means to position one member relative to the other member comprising: a first scale immovably secured to one of said members; a second scale secured to said one member for movement in vernier relationship to said first scale; a third scale secured to said second scale for co-movement therewith; and a fourth scale affixed to the other of said members for movement in vernier relationship to said third scale, whereby vernier positioning between said first and second scales positions said third scale relative to said one member, and vernier positioning between said third and fourth scales positions said other member relative to said one member.

9. The device set forth in claim 3 including base line shift means comprising means to simultaneously adjust said first, second, and third scales relative to said fourth scale.

10. In combination with a mechanism having a pair of members shiftable relative to each other, the improvement in means to position one member relative to the other member comprising: a first scale immovably secured to one of said members; a second scale secured to said one member for movement in vernier relationship to said first scale; a transducer secured to said second scale; an armature secured to the other member; means to energize said transducer; means to rough position said armature to within the field of said transducer; and means to fine position said armature responsive to a signal developed by the energization of said transducer, whereby movement of said second scale relative to said first scale positions said transducer relative to said one member, and positioning of said armature relative to said transducer positions said other member relative to said one member.

11. In combination with a mechanism having a pair of members shiftable relative to each other, the improvement in means to position one member relative to the other member comprising: a first scale immovably secured to one member; a second scale secured to said one member for movement in vernier relationship to said first scale; an armature secured to said second scale; a transducer secured to the other member; means to energize said transducer; means to rough position said other member until said armature is within the field of said transducer; and means to fine position said other member responsive to a signal developed by the energization of said transducer, whereby movement of said second scale relative to said first scale positions said armature relative to said one member, and positioning of said transducer relative to said armature positions said other member relative to said one member.

12. In combination with a mechanism having a pair of members shiftable relative to each other, the improvement in means to position one member relative to the other member comprising: a first scale immovably secured to one member; a second scale secured to said one member for movement in vernier relationship to said first scale; a transducer secured to said second scale; a plurality of armatures secured to the other member; means to energize said transducer; means to rough position a pre-selected armature to within the field of said transducer; and means to fine position said armature responsive to a signal developed by the energization of said transducer; whereby movement of said second scale relative to said first scale positions said transducer relative to said one member, and fine positioning of said armature relative to said transducer positions said other member relative to said one member.

13. In combination with a mechanism having a pair of members shiftable relative to each other, the improvement in means to position one member relative to the other member comprising: a first scale immovably secured to one member; a second scale secured to said one member for movement in vernier relationship to said first scale an armature secured to said second scale; a plurality of transducers secured to the other member; means to energize one of said transducers; means to rough position a pre-selected armature to within the field of said transducer; and means to fine position said armature responsive to a signal developed by the energization of said transducer; whereby movement of said second scale relative to said first scale positions said transducer relative to said one member, and fine positioning of said armature relative to said transducer positions said other member relative to said one member.

14. In combination with a mechanism having a pair of members shiftable relative to each other, the improvement in means to position one member relative to the other member comprising: a first scale immovably secured to said fixed member; a second scale secured to said one member for movement in vernier relationship to said first scale; a plurality of transducers secured to said second scale; a plurality of armatures secured to the other member in vernier relationship with said transducers; means to rough position a pre-selected armature adjacent a pre-selected transducer; and means to fine position said pre-selected armature responsive to a signal developed by the energization of said transducer; whereby movement of said second scale relative to said first scale positions said transducers relative to said one member, and fine positioning of said pre-selected armature relative to said pre-selected transducer positions said other member relative to said one member.

15. In combination with a mechanism having a pair of members shiftable relative to each other, the improvement in means to position one member relative to the other member comprising: a first scale immovably secured to said fixed member; a second scale secured to one member for movement in vernier relationship to said first scale; a plurality of armatures secured to said second scale; a plurality of transducers secured to the other member in vernier relationship with said armatures; means to rough position a pre-selected transducer adjacent a pre-selected armature; means to energize said pre-selected transducer; and means to fine position said pre-selected transducer responsive to a signal developed by the energization of said transducer; whereby movement of said second scale relative to said first scale positions said armatures relative to said one member, and fine positioning of said pre-selected transducer relative to said pre-selected armature positions said other member relative to said one member.

16. In combination with a mechanism having a pair of members shiftable relative to each other, the improvement in means to position one member relative to the other member comprising: a plurality of transducers secured immovably to one member; a plurality of armatures shiftably secured to said one member in vernier relationship with said transducers; position indicating means secured to said one member for integral movement with said armatures; position indicating means secured to the other member and adapted to co-act with said first mentioned position indicating means; means to rough align said position indicating means; and means to fine align said position indicating means responsive to a shifting of said armatures relative to said transducer.

17. In combination with a mechanism having a pair of members shiftable relative to each other, the improvement in means to position one member relative to the other member comprising: a plurality of armatures secured immovably to one member; a plurality of transducers shiftably secured to said one member in vernier relationship with said armatures; position indicating means shiftably secured to said one member for integral movement with said transducers; position indicating means secured to the other member and adapted to co-act with said first mentioned position indicating means; means to rough align said position indicating means; and means to fine align said position indicating means responsive to a shifting of said transducers relative to said armatures.

18. In combination with a mechanism having a pair of members shiftable relative to each other, the improvement in means to position one member relative to the other member comprising: a first plurality of transducer means and a first plurality of armature means secured to one member, one of said means being immovably fixed thereto and the other of said means being shiftably fixed thereto in vernier relationship with the immovably fixed means; a second plurality of transducer means; a second plurality of armature means, one of said second means being attached to said shiftably secured first means, and the other of said second means being attached to the other member in vernier relationship with said previous mentioned second means; means to selectively energize one of said first plurality of transducers; means to bring said energized transducer and a selected armature of said first plurality of armatures into alignment; means to selectively energize one of said plurality of transducer; and means to bring said second energized transducer and a selected armature from said second plurality of armatures into alignment.

19. In combination with a mechanism having a pair of members shiftable relative to each other, the improvement in means to position one member relative to the other member comprising: a first plurality of transducer means and a first plurality of armature means secured to one member, one of said means being immovably fixed thereto and the other of said means being shiftably fixed thereto; position indicating means secured to said shiftable means for movement therewith; indicia on the other member arranged to co-operate with said position indicating means to indicate the relative positions of said pair of members; means to energize said transducer means; servo-motor means adapted to shift said shiftable means relative to said immovable means, said servo-motor means being responsive to a varying signal developed by co-action between said armature means and said transducer means.

20. The mechanism set forth in claim 18, including means to selectively apply a signal in opposition to said transducer-armature developed signal, whereby positioning of said shiftable means by said servo-motor means may be adjusted by selective application of said opposition signal.

21. In combination with a mechanism having a pair of members shiftable relative to each other, the improvement in means to position one member relative to the other member comprising: a pair of co-operating indexing means, one of said indexing means being immovably secured to one member, and the other of said indexing means being secured to said one member for shiftable movement relative to said first mentioned indexing means; transducer means secured to said shiftable indexing means for movement therewith; armature means secured to the other member; means to energize said transducer means; servo-motor means adapted to shift said other member relative to said one member; said servo-motor means being responsive to a varying signal developed by co-action between said armature means and said transducer means.

22. In combination with a mechanism having a pair of members shiftable relative to each other, the improvement in means to position one member relative to the other member comprising: a pair of co-operating indexing means, one of said indexing means being immovably secured to one member, and the other of said indexing means being secured to said one member for shiftable movement relative to said first mentioned indexing means; armature means secured to said shiftable indexing means for movement therewith; transducer means secured to the other member; means to energize said transducer means; servo-motor means adapted to shift said other member relative to said one member, said servo-motor means being responsive to a varying signal developed by co-action between said armature means and said transducer means.

23. In combination with a mechanism having a pair of members shiftable relative to each other, the improvement in positioning means comprising: a first scale immovably secured to one member; a second co-acting scale shiftably secured to said one member; one of said scales comprising a plurality of armatures, the other of said scales comprising a plurality of transducers; means to selectively energize one of said transducers; servo-motor means adapted to shift said second scale, said servo-motor means being responsive to the output of said energized transducer; a third scale secured to said second scale for shiftable movement therewith; a fourth scale secured to the other member, one of said third and fourth scales comprising a plurality of armatures and the other of said third and fourth scales comprising a plurality of transducers; means to selectively energize one of said last mentioned plurality of transducers; second servo-motor means adapted to position said other member, said second servo-motor means being responsive to the output of said last mentioned energized transducer.

24. In combination with a mechanism having a pair of members shiftable relative to each other, the improvement in means to position one member relative to the other member comprising: first transducer means and first armature means secured to one member, one of said means being immovably fixed thereto and the other of said means being shiftably fixed thereto; position indicating means secured to said shiftable means for movement therewith; indicium on the other member arranged to co-operate with said position indicating means to indicate the relative positions of said fixed and movable members; means to energize said transducer means; and means to align said transducer means and said armature means responsive to a signal developed by the co-action between the relatively moving armature means and transducer means.

25. In combination with a mechanism having a pair of members shiftable relative to each other, the improvement in means to position one member relative to the other member comprising: a long stroke transducer secured to one member including concentric primary and secondary coils co-wound to provide a hollow core; an armature adapted to be shifted within and along the axis of said coils; means to energize said coils, means to shift said armature to establish a null condition between said primary and secondary coils; position indicating means secured to said one member adapted to be shifted proportionate to the movement of said armature; indicium on the other member adapted to co-act with said position indicating means to indicate the relative positions of said members; and means to shift said other member to align said indicium with said position indicating means.

26. In combination with a pair of members shiftable relative to each other, the improvement in positioning means comprising: a solenoid secured to one member; an armature shiftable within said solenoid; means to shift said armature relative to said solenoid; a position indicator secured to said armature for movement therewith; indicia affixed to the other member; and means to select one of said indicia and to position said selected indicium relative to said indicator.

27. In combination with a pair of members shiftable relative to each other, the improvement in positioning means comprising: a solenoid secured to one member; an armature shiftable within said solenoid; means to shift said armature relative to said solenoid; transducer means; armature means, one of said means being secured to said armature for movement therewith, the other of said means being secured to the other member; and means to shift said other member to align said transducer means and said armature means.

28. In combination with a pair of members shiftable relative to each other, the improvement in positioning means comprising: a solenoid secured to one member; an armature shiftable within said solenoid; means to shift said armature relative to said solenoid; a transducer secured to said armature for movement therewith; a plurality of armatures secured to the other member; and means to shift said other member to align said transducer and one of said armatures.

29. In combination with a pair of members shiftable relative to each other, the improvement in positioning means comprising: a solenoid secured to one member; an armature shiftable within said solenoid; means to shift said armature relative to said solenoid; a second armature secured to said first mentioned armature for movement therewith; a plurality of transducers secured to the member; and means to shift said other member to align said second armature and one of said transducers.

30. In combination with a pair of members shiftable relative to each other, the improvement in positioning means comprising: a solenoid secured to one member; an armature shiftable within said solenoid; means to shift said armature relative to said solenoid; a plurality of transducers secured to said armature for movement therewith; a plurality of armatures secured to the other member; means to energize one of said transducers; and means to shift said other member to align one of said plurality of armatures with said energized transducer.

31. In combination with a pair of members shiftable relative to each other, the improvement in positioning means comprising: a solenoid secured to one member; an armature shiftable within said solenoid; means to shift said armature relative to said solenoid; a plurality of armatures secured to said first mentioned armature for movement therewith; a plurality of transducers secured to the other member; means to energize one of said transducers; and means to shift said other member to align one of said plurality of armatures with said energized transducer.

32. In combination with a mechanism having a pair of members shiftable relative to each other, and a plurality of armatures on one member spaced apart in the direction of movement of said member, the improvement in self-contained module means to position said one member relative to the other member comprising: a module housing attachable to said other member; transducer means mounted in said housing; means to energize said transducer means; armature means mounted in said housing; means to shift said transducer means and said armature means relative to each other responsive to a signal developed by the co-action between said energized transducer means and said armature means; second transducer means shiftable responsive to relative movement between said first mentioned transducer means and said first mentioned armature means; potentiometer means adapted to rough position one of said plurality of armatures on said one member adjacent said second transducer means; means to energize said second transducer means; and means to fine position said one of said plurality of armatures relative to said second mentioned transducer means responsive to the signal developed by the co-action between said energized transducer and said one of said plurality of armatures.

33. The module set forth in claim 24, including means to shift said housing relative to said other member.

34. In combination with a mechanism having a pair of members shiftable relative to each other, a plurality of armatures on one member spaced apart in the direction of movement of said movable member, and a rack secured to said one member in alignment with said armatures, the improvement in self-contained module means to position said one member relative to the other member comprising: in a module housing attachable to said other member, transducer means; means to energize said transducer means; armature means; means to shift said armature means and transducer means relative to each other responsive to a signal developed by the co-action between energized transducer means and said armature means; second transducer means shiftable responsive to relative movement between said first mentioned transducer means and armature means; means to energize said second transducer means; potentiometer means; a means to energize said potentiometer means; wiper means associated with said potentiometer means adapted to vary the resistance of said potentiometer in proportion to linear displacement of said one member relative to said other member; resistance means associated with each of said plurality of armature means; means to shift said one member until the resistance of said potentiometer balances a preselected resistance means whereby to rough position one of said plurality of armatures in alignment with said second transducer means; and means to fine position said one of said plurality of armatures with said second transducer means responsive to the signal developed by the co-action between said energized second transducer and said one of said plurality of armatures.

35. The module set forth in claim 34, including means to effect base line adjustment after arbitrarily shifting said movable member comprising: means to simultaneously shift said module housing and said second transducer means to center said second transducer means on the nearest adjacent armature of said plurality of armatures; and means to vary the resistance of said resistance means to balance the resistance of said potentiometer.

No references cited.